United States Patent
Dragosh et al.

(10) Patent No.: US 6,366,886 B1
(45) Date of Patent: *Apr. 2, 2002

(54) SYSTEM AND METHOD FOR PROVIDING REMOTE AUTOMATIC SPEECH RECOGNITION SERVICES VIA A PACKET NETWORK

(75) Inventors: Pamela Leigh Dragosh, Bedminster, NJ (US); David Bjorn Roe, Santa Barbara, CA (US); Robert Douglas Sharp, Morristown, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/533,820

(22) Filed: Mar. 24, 2000

Related U.S. Application Data

(63) Continuation of application No. 08/833,210, filed on Apr. 14, 1997, now Pat. No. 6,078,886.

(51) Int. Cl.[7] ............................................. G01L 15/06
(52) U.S. Cl. .................... 704/270.1; 704/275; 704/243; 707/10
(58) Field of Search ............................. 704/270.1, 243, 704/251, 231, 255, 275, 270; 707/10

(56) References Cited

U.S. PATENT DOCUMENTS

| | | |
|---|---|---|
| 5,231,691 A | 7/1993 | Yasuda |
| 5,425,128 A | 6/1995 | Morrison |
| 5,475,792 A * | 12/1995 | Stanford et al. ............ 704/233 |
| 5,524,169 A | 6/1996 | Cohen et al. |
| 5,548,729 A | 8/1996 | Akiyoshi et al. |
| 5,553,119 A | 9/1996 | McAllister et al. |
| 5,623,605 A | 4/1997 | Keshav et al. |
| 5,682,478 A | 10/1997 | Watson et al. |
| 5,732,219 A | 3/1998 | Blumer et al. |
| 5,745,754 A | 4/1998 | Lagarde et al. |
| 5,745,874 A | 4/1998 | Neely |
| 5,752,232 A | 5/1998 | Basore et al. |
| 5,890,123 A * | 3/1999 | Brown et al. ............... 704/275 |
| 6,078,886 A * | 6/2000 | Dragosh et al. ............ 704/270 |

FOREIGN PATENT DOCUMENTS

| | | |
|---|---|---|
| EP | 0607615 A1 | 7/1994 |
| EP | 0854418 A2 | 7/1998 |
| JP | 07222248 | 8/1995 |

OTHER PUBLICATIONS

"Integrating Speech Technology with Voice Response Units Systems", IBM Technical Disclosure Bulletin, vol. 38, No. 10, Oct. 1, 1995, pp. 215–216, XP000540471.

Carlson, S., et al.: "Application of Speech Recognition Technology To ITS Advanced Traveloer Information Systems", Pacific Rim Transtech Conference Vehicle Navigation and Information Systems Conference Proceedings, Washington, Jul. 30–Aug. 2, 1995, No. CONF. 6, Jul. 30, 1995, pp. 118–125, XP000641143, IEEE, ¶ II.

"Client–Server Model for Speech Recognition", IBM Technical Disclosure Bulletin, vol. 36, No. 3, Mar. 1, 1993, pp. 25–26, XP000354688.

* cited by examiner

Primary Examiner—William Korzuch
Assistant Examiner—Abul K. Azad
(74) Attorney, Agent, or Firm—Kenyon & Kenyon

(57) ABSTRACT

A system and method of operating an automatic speech recognition service using a client-server architecture is used to make ASR services accessible at a client location remote from the location of the main ASR engine. The present invention utilizes client-server communications over a packet network, such as the Internet, where the ASR server receives a grammar from the client, receives information representing speech from the client, performs speech recognition, and returns information based upon the recognized speech to the client.

66 Claims, 7 Drawing Sheets

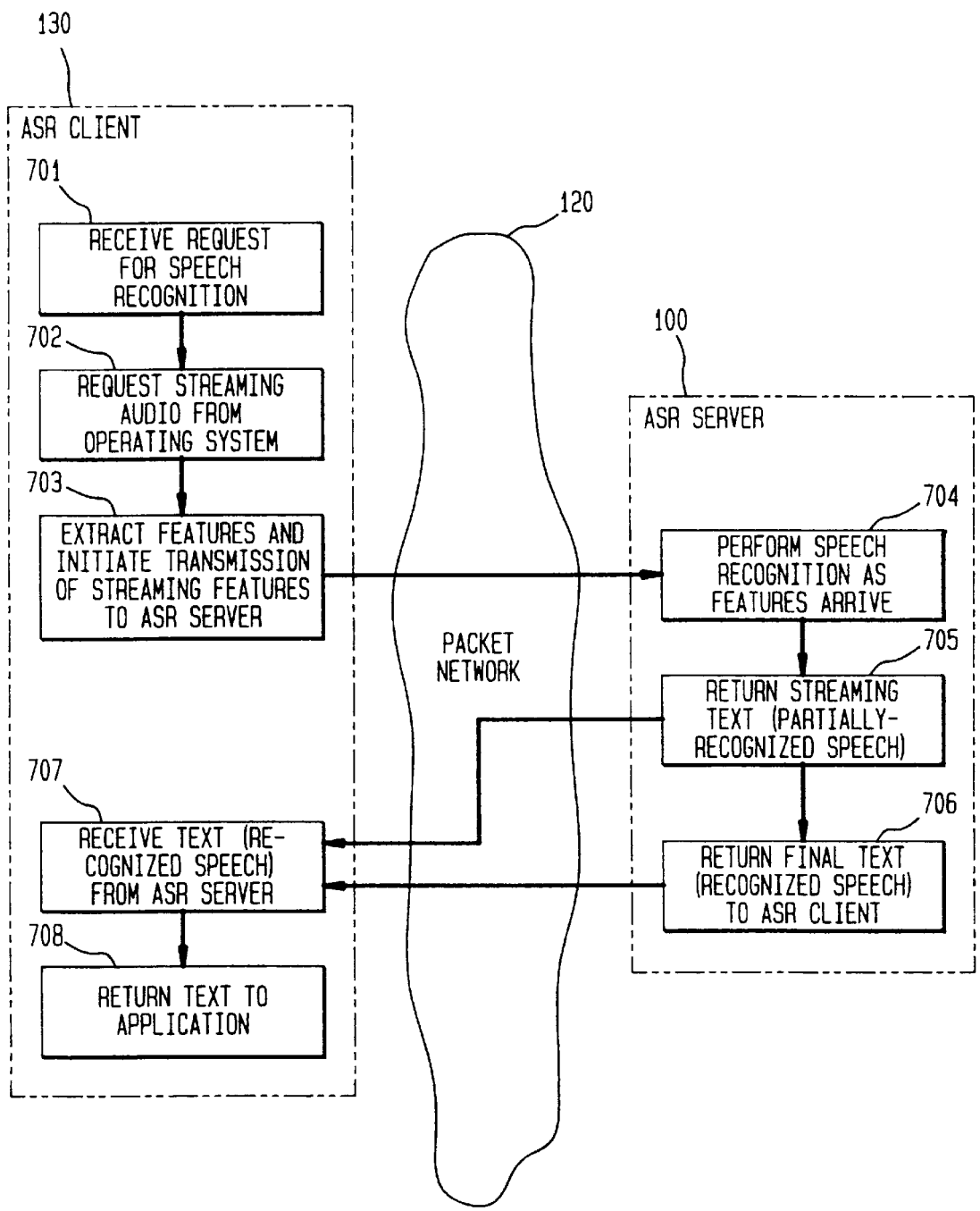

SYSTEM AND METHOD FOR PROVIDING REMOTE AUTOMATIC SPEECH RECOGNITION SERVICES VIA A PACKET NETWORK

This application is a continuation of Ser No. 08/833,210 filed Apr. 14, 1977 now U.S. Pat. No. 6,078,886.

TECHNICAL FIELD

This invention relates to speech recognition in general and, more particularly, provides a way of providing remotely-accessible automatic speech recognition services via a packet network.

BACKGROUND OF THE INVENTION

Techniques for accomplishing automatic speech recognition (ASR) are well known. Among known ASR techniques are those that use grammars. A grammar is a representation of the language or phrases expected to be used or spoken in a given context. In one sense, then, ASR grammars typically constrain the speech recognizer to a vocabulary that is a subset of the universe of potentially-spoken words; and grammars may include sub-grammars. An ASR grammar rule can then be used to represent the set of "phrases" or combinations of words from one or more grammars or subgrammars that may be expected in a given context. "Grammar" may also refer generally to a statistical language model (where a model represents phrases), such as those used in language understanding systems.

Products and services that utilize some form of automatic speech recognition ("ASR") methodology have been recently introduced commercially. For example, AT&T has developed a grammar-based ASR engine called WATSON that enables development of complex ASR services. Desirable attributes of complex ASR services that would utilize such ASR technology include high accuracy in recognition; robustness to enable recognition where speakers have differing accents or dialects, and/or in the presence of background noise; ability to handle large vocabularies; and natural language understanding. In order to achieve these attributes for complex ASR services, ASR techniques and engines typically require computer-based systems having significant processing capability in order to achieve the desired speech recognition capability. Processing capability as used herein refers to processor speed, memory, disk space, as well as access to application databases. Such requirements have restricted the development of complex ASR services that are available at one's desktop, because the processing requirements exceed the capabilities of most desktop systems, which are typically based on personal computer (PC) technology.

Packet networks are general-purpose data networks which are well-suited for sending stored data of various types, including speech or audio. The Internet, the largest and most renowned of the existing packet networks, connects over 4 million computers in some 140 countries. The Internet's global and exponential growth is common knowledge today.

Typically, one accesses a packet network, such as the Internet, through a client software program executing on a computer, such as a PC, and so packet networks are inherently client/server oriented. One way of accessing information over a packet network is through use of a Web browser (such as the Netscape Navigator, available from Netscape Communications, Inc., and the Internet Explorer, available from Microsoft Corp.) which enables a client to interact with Web servers. Web servers and the information available therein are typically identified and addressed through a Uniform Resource Locator (URL)-compatible address. URL addressing is widely used in Internet and intranet applications and is well known to those skilled in the art (an "intranet" is a packet network modeled in functionality based upon the Internet and is used, e.g., by companies locally or internally).

What is desired is a way of enabling ASR services that may be made available to users at a location, such as at their desktop, that is remote from the system hosting the ASR engine.

SUMMARY OF THE INVENTION

A system and method of operating an automatic speech recognition service using a client-server architecture is used to make ASR services accessible at a client location remote from the location of the main ASR engine. In accordance with the present invention, using client-server communications over a packet network, such as the Internet, the ASR server receives a grammar from the client, receives information representing speech from the client, performs speech recognition, and returns information based upon the recognized speech to the client. Alternative embodiments of the present invention include a variety of ways to obtain access to the desired grammar, use of compression or feature extraction as a processing step at the ASR client prior to transferring speech information to the ASR server, staging a dialogue between client and server, and operating a form-filling service.

BRIEF DESCRIPTION OF THE DRAWINGS

FIG. 7 is a diagram showing another alternative process for enabling remote automatic speech recognition in accordance with the present invention.

DETAILED DESCRIPTION

The present invention is directed to a client-server based system for providing remotely-available ASR services. In accordance with the present invention, ASR services may be provided to a user—e.g., at the user's desktop—over a packet network, such as the Internet, without the need for the user to obtain computer hardware having the extensive processing capability required for executing full ASR techniques.

Figure 1:
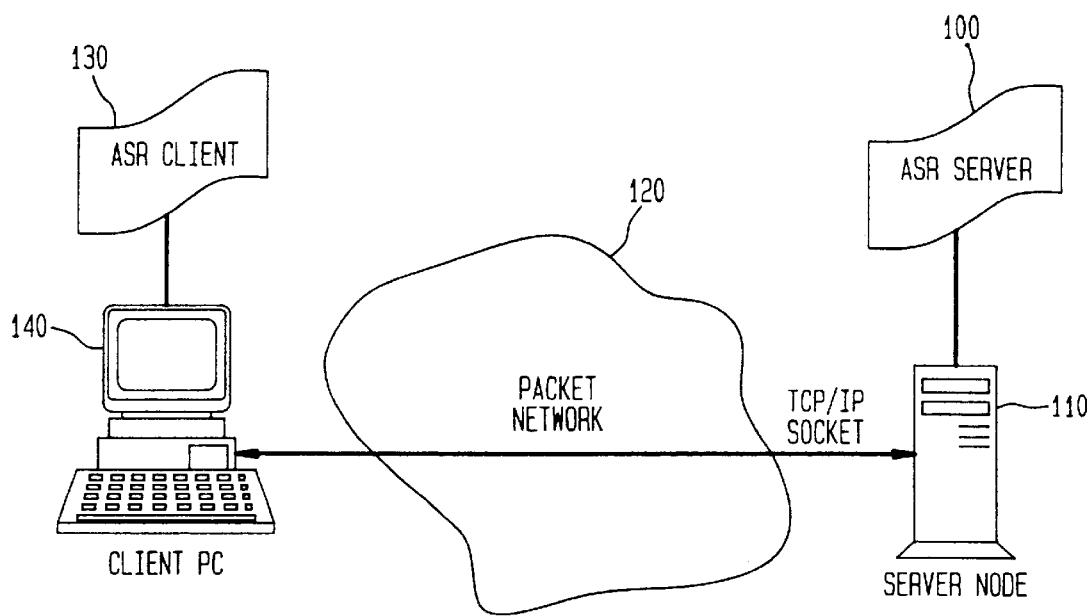
FIG. 1 is a diagram showing a client-server relationship for a system providing remote ASR services in accordance with the present invention.

A basic client-server architecture used in accordance with the present invention is shown in FIG. 1. ASR server 100 is an ASR software engine which executes on a system, denoted as server node 110, that can be linked across packet network 120 (such as the Internet) to other computers. Server node 110 may typically be a computer having processing capability sufficient for running complex ASR-based applications, such as the AT&T WATSON system. Packet network 120 may, illustratively, be the Internet or an intranet.

ASR client 130 is a relatively small program. (when compared to ASR server 100) that executes on client PC 140. Client PC 140 is a computer, such as a personal computer (PC), having sufficient processing capability for running client applications, such as a Web browser. Client PC includes hardware, such as a microphone, and software for the input and capture of audio sounds, such as speech. Methods for connecting microphones to a PC and capturing audio sounds, such as speech, at the PC are well known. Examples of speech handling capabilities for PCS include the Speech Application Programmer Interface (SAPI) from Microsoft and the AT&T Advanced Speech Application Programmer Interface (ASAPI). Details of the Microsoft SAPI are found in, e.g., a publication entitled "Speech API Developers Guide, Windows™ 95 Edition," Vers. 1.0, Microsoft Corporation (1995), and details of the AT&T ASAPI are provided in a publication entitled "Advanced Speech API Developers Guide," Vers. 1.0, AT&T Corporation (1996); each of these publications is incorporated herein by reference. An alternative embodiment of the present invention may utilize an interface between ASR client 130 and one or more voice channels, such that speech input may be provided by audio sources other than a microphone.

Client PC 140 also has the capability of communicating with other computers over a packet network (such as the Internet). Methods for establishing a communications link to other computers over a packet network (such as the Internet) are well known and include, e.g., use of a modem to dial into an Internet service provider over a telephone line.

ASR server 100, through server node 110, and ASR client 130, through client PC 140, may communicate with one another over packet network 120 using known methods suitable for communicating information (including the transmission of data) over a packet network using, e.g., a standard communications protocol such as the Transmission Control Protocol/Internet Protocol (TCP/IP) socket. A TCP/IP socket is analogous to a "pipe" through which information may be transmitted over a packet network from one point to another.

Establishment of a TCP/IP socket between ASR server 100 and ASR client 130 will enable the transfer of data between ASR server 100 and ASR client 130 over packet network 120 necessary to enable remote ASR services in accordance with the present invention. ASR client 130 also interfaces with audio/speech input and output capabilities and text/graphics display capabilities of client PC 140. Methods and interfaces for handling input and output of audio and speech are well known, and text and graphics display handling methods and interfaces are also well known.

ASR client 130 may be set up to run in client PC 140 in several ways. For example, ASR client 130 may be loaded onto client PC 140 from a permanent data storage medium, such as a magnetic disk or CD-ROM. In the alternative, ASR client 130 may be downloaded from an information or data source locatable over a packet network, such as the Internet. Downloading of ASR client 130 may, e.g., be accomplished once to reside permanently in client PC 140; alternatively, ASR client 130 may be downloaded for single or limited use purposes. ASR client 130 may be implemented, e.g., as a small plug-in software module for another program, such as a Web browser, that executes on client PC 140. One way of accomplishing this is to make ASR client 130 an Active-X software component according to the Microsoft Active-X standard. In this way, ASR client 130 may, e.g., be loaded into client PC 140 in conjunction with a Web browsing session as follows: a user browsing the World Wide Web using client PC 140 enters a Web site having ASR capability; the Web site asks the user permission to download an ASR client module into client PC 140 in accordance with signed Active-X control; upon the user's authorization, ASR client 130 is downloaded into client PC 140. Similarly, ASR server 100 may be set up to run in server node 110 in several ways, for example, ASR server may be loaded onto server node 100 from a permanent data storage medium, such as a magnetic disk or CD-ROM, or, in the alternative, ASR server 100 may be downloaded from an information or data source locatable over a packet network, such as the Internet.

Further details of providing remote ASR services in accordance with the present invention will now be described with reference to FIGS. 2–7. It is presumed for the discussion to follow with respect to each of these figures that the client-server relationship is as shown in FIG. 1. A setup phase is used to prepare ASR server 100 and ASR client 130 for performing an automatic speech recognition task as part of an ASR application. For convenience, items shown in FIG. 1 and appearing in other figures will be identified by the same reference numbers as in FIG. 1.

Figure 2:
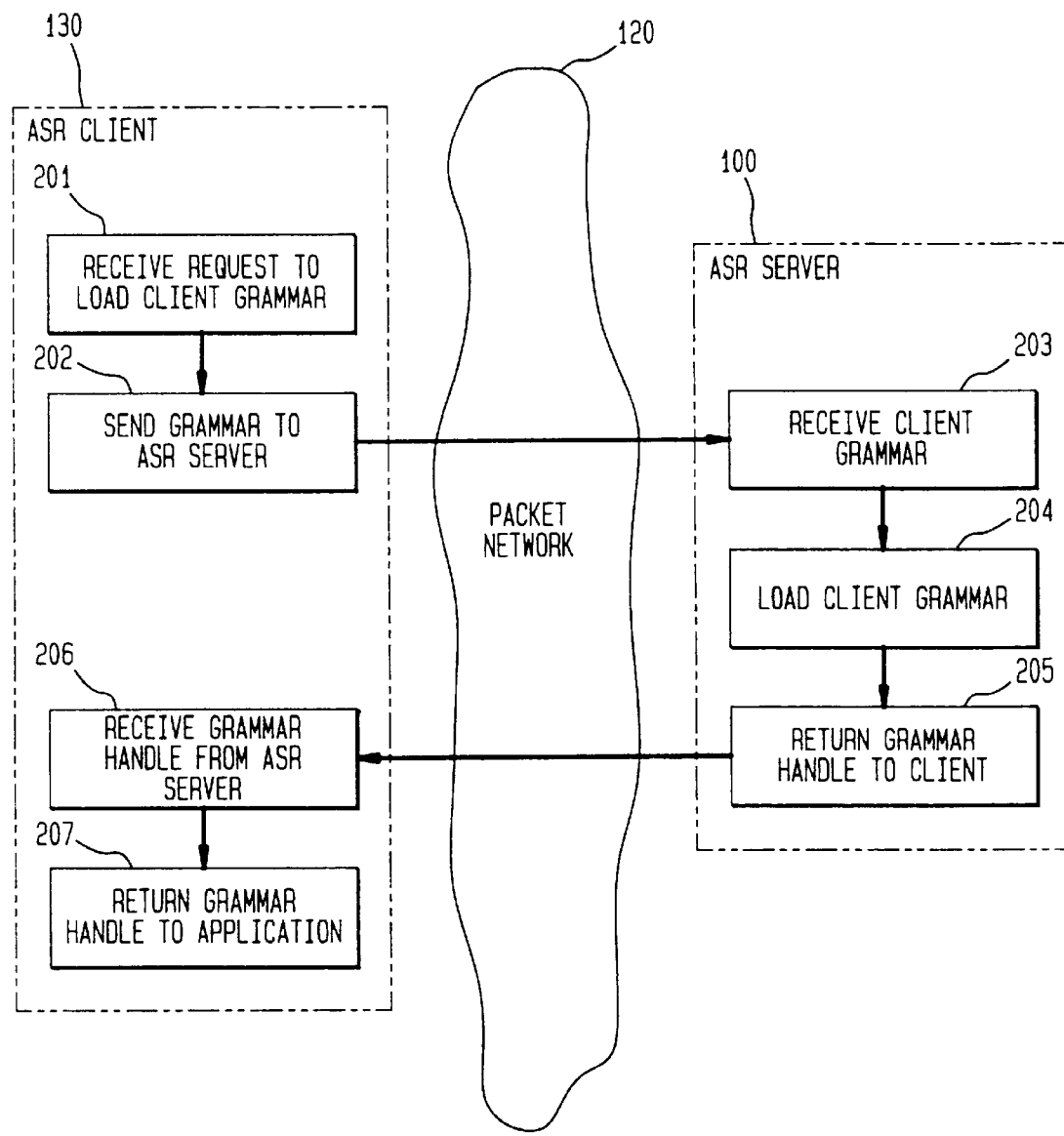
FIG. 2 is a diagram showing a setup process for enabling remote ASR services in accordance with the present invention.

Referring now to FIG. 2, a setup phase in a process of providing remote ASR services will now be described. At step 201, ASR client 130 receives a request from the application to load a client grammar. The client grammar is illustratively a data file containing information representing the language (e.g., words and phrases) expected to be spoken in the context of the particular ASR application. The data file may be in a known format, such as the Standard Grammar Format (SGF) which is part of the Microsoft SAPI.

For purposes of illustration, an ASR application for taking a pizza order will be used in describing the present invention. An ASR service application, such as an application for pizza-ordering, would typically include a program that interfaces with and uses ASR client 130 as a resource used for accomplishing the tasks of the ASR application. Such an ASR application could reside and execute, in whole or in part, in client PC 140.

Considering the pizza ordering example, the client grammar PIZZA would include information representing words that one may use in ordering pizza, such as "pizza," "pepperoni," etc. In fact, subgrammars may be used to build an appropriate grammar. For the pizza ordering example, subgrammars for the PIZZA grammar could include SIZE and TOPPING. The subgrammar SIZE could consist of words used to describe the size of the pizza desired, such as "small," "medium" and "large." The subgrammar TOPPING may consist of words used to describe the various toppings one may order with a pizza, e.g., "sausage," "pepperoni," "mushroom" and the like.

ASR client 130.may be given the desired grammar from the application or, alternatively, ASR client 130 may choose the grammar from a predetermined set based upon information provided by the application. Either way, ASR client 130 then at step 202 sends the desired grammar file to ASR server 100 over a TCP/IP socket. A new TCP/IP socket may have to be set up as part of establishing a new communications session between client PC 140 and server node 100, or the TCP/IP socket may already exist as the result of an established communications session between client PC 140 and server node 110 that has not been terminated. In the pizza ordering illustration, ASR client 130 would cause transmission of a file containing the PIZZA grammar to ASR server 100 over a TCP/IP socket.

At step 203, ASR server 100 receives the client grammar sent from ASR client 130 and, at step 204, ASR server loads the transmitted client grammar. As used herein, "loading" of the client grammar means to have the grammar accessible for use by ASR server 100, e.g. by storing the grammar in RAM of server node 110. At step 205, ASR server 100 returns a grammar "handle" to ASR client 130. A grammar "handle" is a marker, such as, e.g., a pointer to memory containing the loaded grammar, that enables ASR client to easily refer to the grammar during the rest of the communications session or application execution. ASR client 130 receives the grammar handle from ASR server 100 at step 206 and returns the handle to the application at step 207. For the pizza ordering example, ASR server 100 would receive and load the transmitted PIZZA grammar file and transmit back to ASR client 130 a handle pointing to the loaded PIZZA grammar. ASR client, in turn, would receive the PIZZA handle from ASR server 100 and return the PIZZA handle to the pizza ordering application. In this way, the application can simply refer to the PIZZA handle when carrying out or initiating an ASR task as part of the pizza ordering application.

Figure 3:
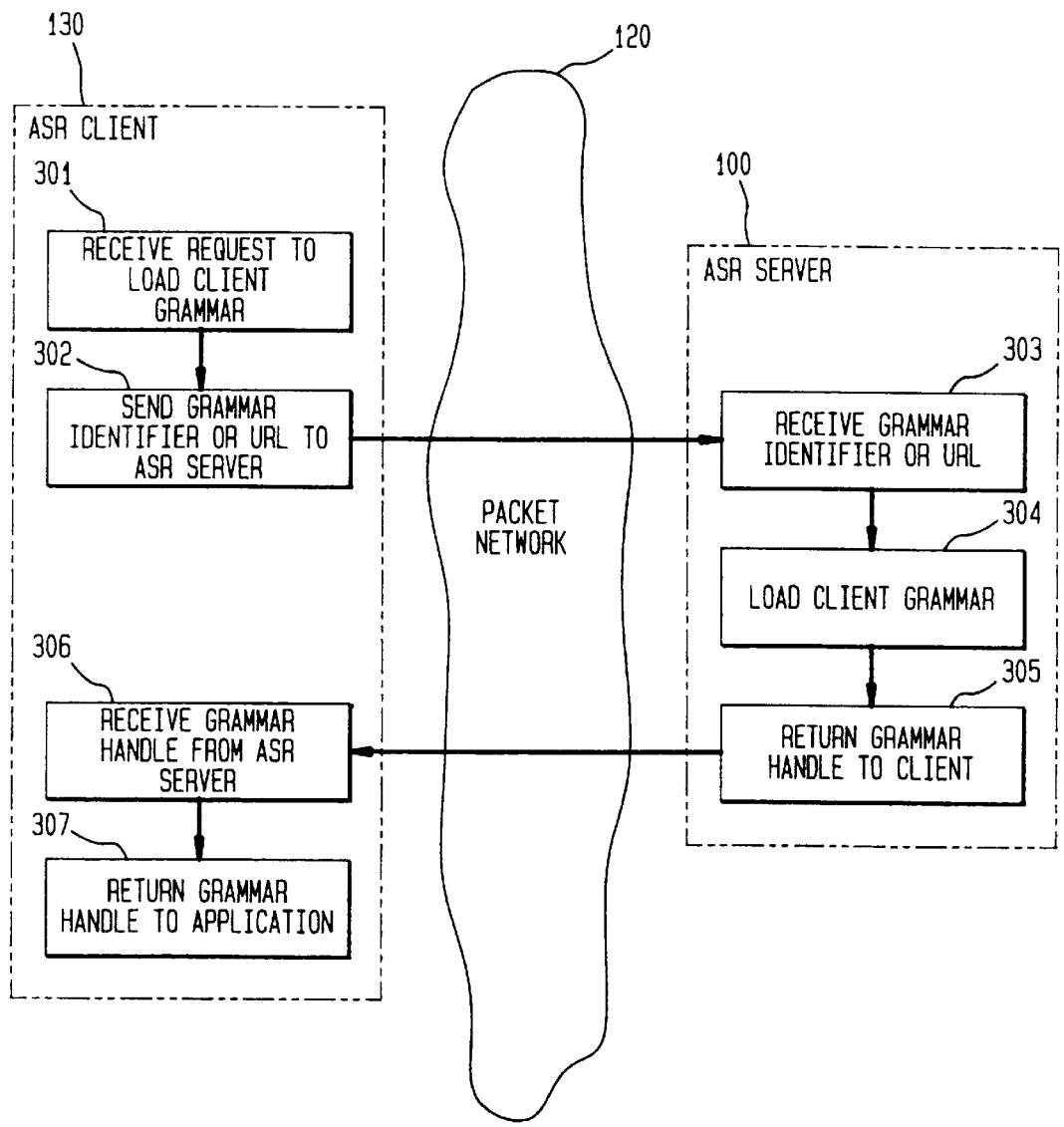
FIG. 3 is a diagram showing an alternative setup process for enabling remote ASR services in accordance with the present invention.

An alternative setup approach will now be described with reference to FIG. 3. It is assumed for the remainder of the description herein that transmission or communication of information or data between ASR server 100 and ASR client 130 take place over an established TCP/IP socket. At step 301, ASR client 130 receives a request from the application to load a client grammar. Rather than send the client grammar as a data file to ASR server 100 at step 302, however, ASR client 130 instead sends to ASR server 100 an identifier representing a "canned" grammar; a "canned grammar would, e.g., be a common grammar, such as TIME-OF-DAY or DATE, which ASR server 100 would already have stored. Alternatively, ASR client 130 could send to ASR server 100 an IP address, such as a URL-compatible address, where ASR server 100 could find the desired grammar file. ASR server 100 at step 303 receives the grammar identifier or URL grammar address from ASR client 130, locates and loads the requested client grammar at step 304, and at step 305 returns a grammar handle to ASR client 130. Similar to the steps described above with respect to FIG. 2, ASR client 130 receives the grammar handle from ASR server 100 at step 306 and returns the handle to the application at step 307. For the pizza ordering example, the steps described above in connection with FIG. 2 would be the same, except that ASR client 130 would send to ASR server 100 a grammar identifier for the PIZZA grammar (if it were a "canned" grammar) or a URL address for the location of a file containing the PIZZA grammar; ASR server 100 would, in turn, retrieve a file for the PIZZA grammar based upon the grammar identifier or URL address (as sent by the ASR client) and then load the requested PIZZA grammar.

Figure 4:
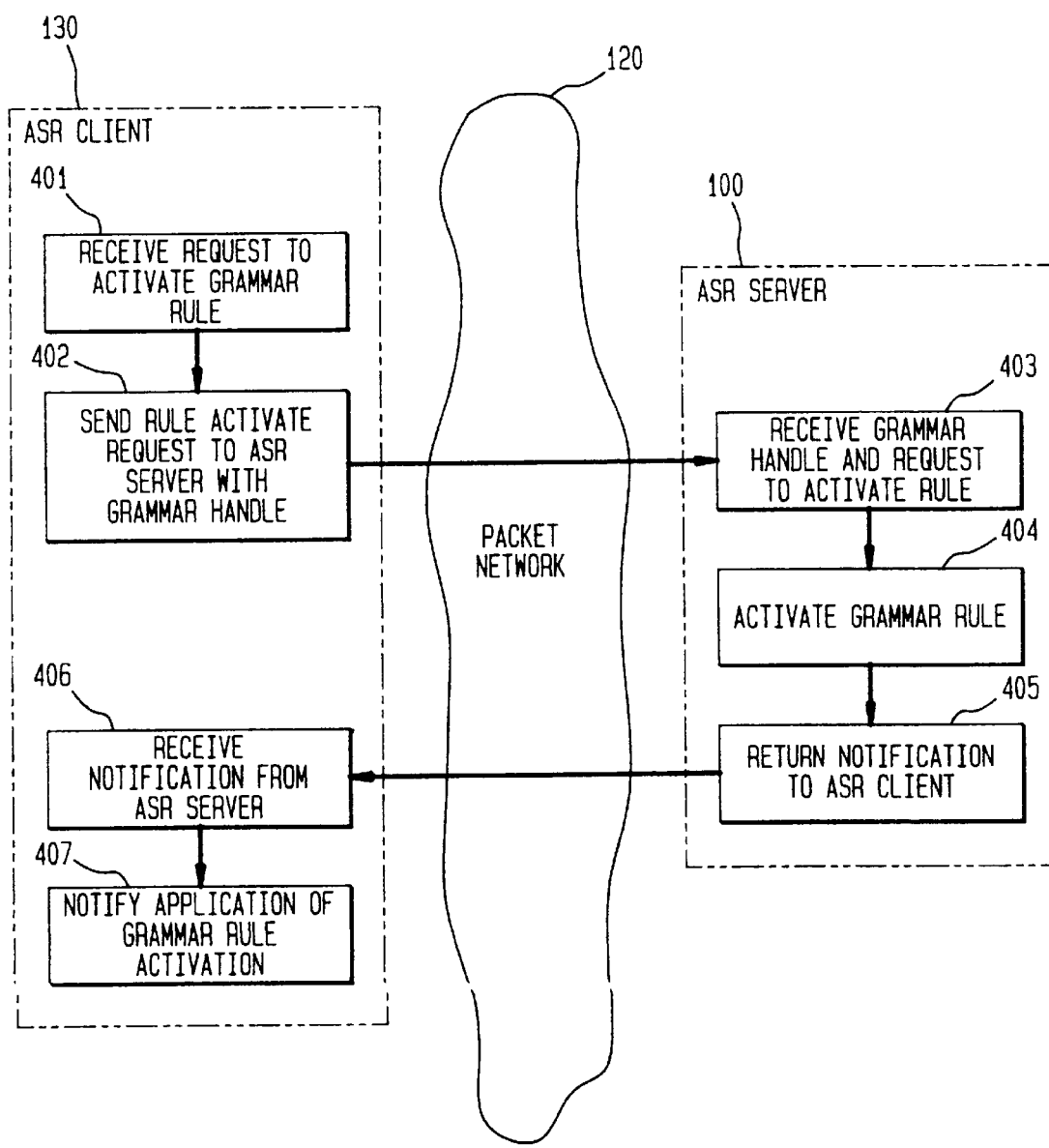
FIG. 4 is a diagram showing a process for rule selection in accordance with the present invention.

After the grammar has been loaded and a grammar handle returned to ASR client 130, an ASR service application needs to select a grammar rule to be activated. FIG. 4 shows a process for grammar rule selection in accordance with the present invention. ASR client 130 receives from the application a request to activate a grammar rule at step 401. At step 402, ASR client sends a rule activate request to ASR server 100; as shown in FIG. 4, ASR client 130 may also at step 402 send to ASR server 100 the previously-returned grammar handle (which may enable ASR server to activate the appropriate grammar rule for the particular grammar as identified by the grammar handle). ASR server 100 at step 403 receives the rule activate request and grammar handle (if sent). At step 404, ASR server 100 activates the requested rule and, at step 405, returns to ASR client 130 notification that the requested rule has been activated. ASR client 130 receives at step 406 the notification of rule activation and notifies the application at step 407 that the rule has been activated. Once the application receives notice of rule activation, it may then initiate recognition of speech.

For purposes of illustrating the process shown in FIG. 4, again consider the pizza ordering example. A rule that may be used for recognizing a pizza order may set the desired phrase for an order to include the subgrammars SIZE and TOPPINGS along with the word "pizza," and might be denoted in the following manner: {ORDER=SIZE "pizza" "with" TOPPINGS}. With reference again to FIG. 4, ASR client 130 would receive from the application a request to activate a pizza ordering rule and send the ORDER rule set out above to ASR server 100 along with the PIZZA grammar handle. ASR server receives the rule activate request along with the PIZZA grammar handle and activates the ORDER rule, such that the recognizer would be constrained to recognizing words from the SIZE subgrammar, the word "pizza," the word "with" and words from the subgrammar TOPPINGS. After activating the ORDER rule, ASR server 100 sends notification of the rule activation to ASR client 130 which, in turn notifies the application.

Figure 5:
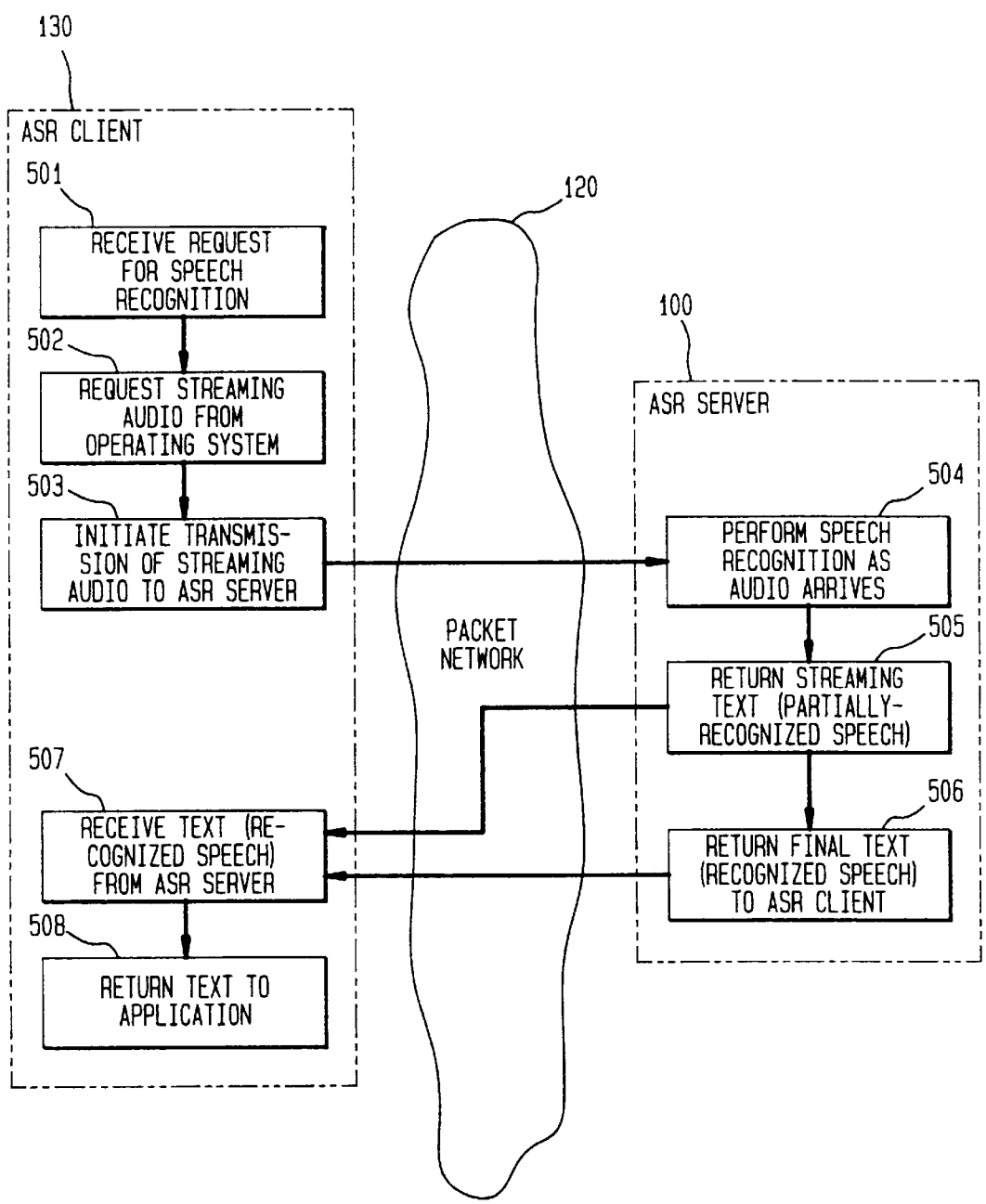
FIG. 5 is a diagram showing a process for enabling remote automatic speech recognition in accordance with the present invention.

Once a grammar rule has been activated, the processing of speech for purposes of recognizing words in the grammar according to the rule can take place. Referring to FIG. 5, at step 501 ASR client 130 receives a request from the application to initiate a speech recognition task. At step 502, ASR client 130 requests streaming audio from the audio input of client PC 140. Streaming audio refers to audio being processed "on the fly" as more audio comes in; the system does not wait for all of the audio input (i.e., the entire speech) before sending the audio along for digital processing; streaming audio may also refer to partial transmission of part of the audio signal as additional audio is input. Illustratively, a request for streaming audio may be accomplished by making an appropriate software call to the operating system running on client PC 140 such that streaming audio from the microphone input is digitized by the sound processor of client PC 140. Streaming audio digitized from the microphone input is then passed along to ASR client 130. ASR client 130 then initiates transmission of streaming digitized audio to ASR server 100 at step 503; like the audio input from the microphone, the digitized audio is sent to ASR server 100 "on the fly" even while speech input continues.

At step 504, ASR server 100 performs speech recognition on the streaming digitized audio as the audio is received from ASR client 130. Speech recognition is performed using known recognition algorithms, such as those employed by the AT&T WATSON speech recognition engine, and is performed within the constraints of the selected grammar as defined by the activated rule. At step 505, ASR server 100 returns streaming text (i.e., partially recognized speech) as the input speech is recognized. Thus, as ASR server 100 reaches its initial results, it returns those results to ASR client 130 even as ASR server 100 continues to process additional streaming audio being sent by ASR client 130. This process of returning recognized text "on the fly" permits ASR client 130 (or the application interfacing with ASR client 130) to provide feedback to the speaker. As ASR server 100 continues to process additional streaming input audio, it may correct the results of the earlier speech recognition, such that the returned text may actually update (or correct) parts of the text already returned to ASR client 130 as part of the speech recognition task. Once all of the streaming audio has been received from ASR client 130, ASR server completes its speech recognition processing and returns a final version of recognized text (including corrections) at step 506.

At step 507, ASR client 130 receives the recognized text from ASR server 100 and returns the text to the application at step 508. Again, this may be done "on the fly" as the recognized text comes in, and ASR client passes along to the application any corrections to recognized text received from ASR server 100.

Referring to the pizza ordering example, once the ORDER rule has been activated and the application notified, ASR client 130 will receive a request to initiate speech recognition and will initiate streaming audio from the microphone input. The speaker may be prompted to speak the pizza order, and once speaking begins, ASR client 130 sends digitized streaming audio to ASR server 100. Thus, as the speaker states, e.g., that she wants to order a "large pizza with sausage and pepperoni," ASR client 130 will have sent digitized streaming audio for the first word of the order along to ASR server 100 even as the second word is being spoken. ASR server 100 will, as the order is being spoken, return the first word as text "large" as the rest of the order is being spoken. Ultimately, once the speaker stops speaking, the final recognized text for the order, "large pizza with sausage, pepperoni" can be returned to ASR client 130 and, hence, to the application.

Figure 6:
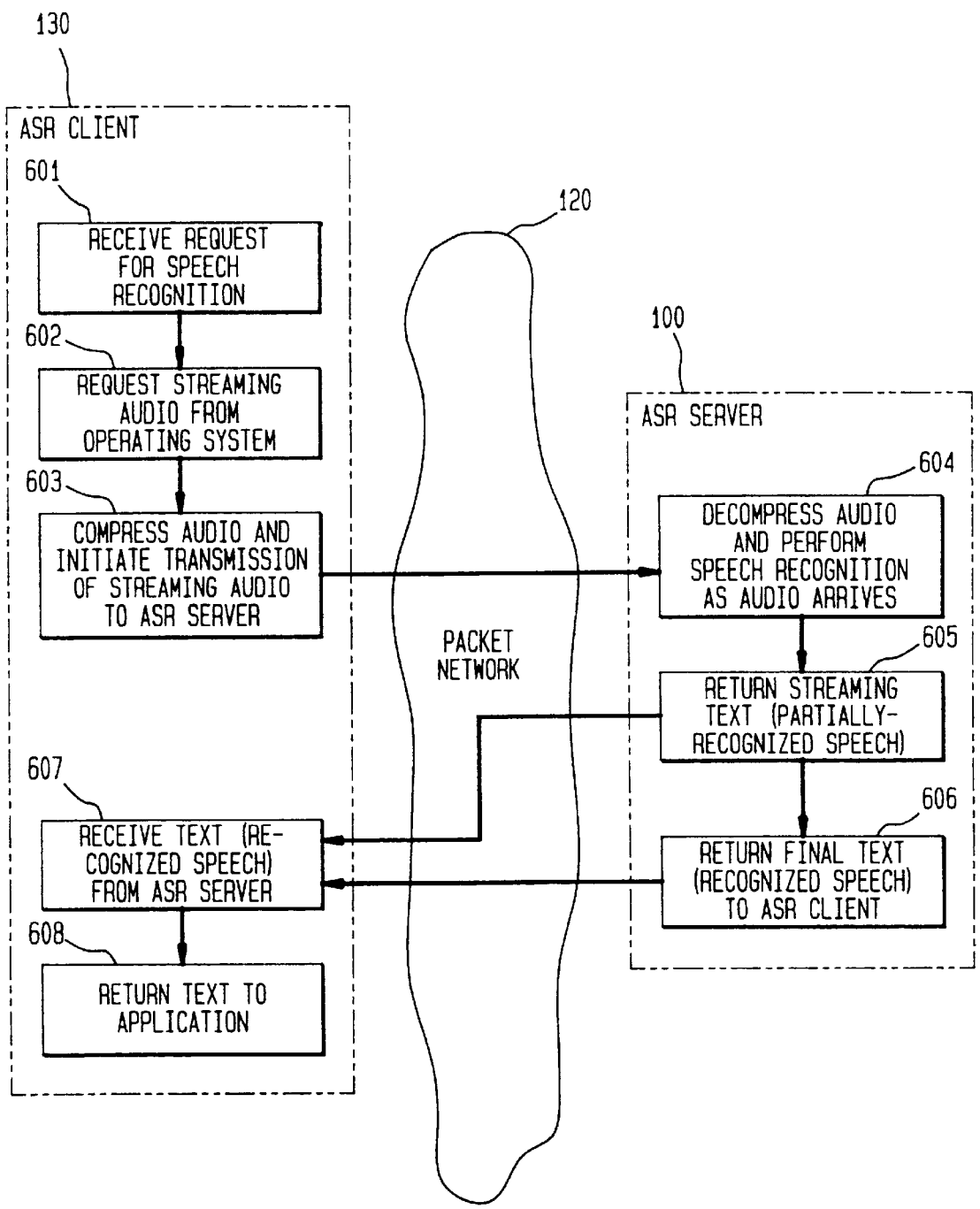
FIG. 6 is a diagram showing an alternative process for enabling remote automatic speech recognition in accordance with the present invention.

An alternative embodiment for carrying out the speech recognition process in accordance with the present invention is shown in FIG. 6. Similar to the speech recognition process shown in FIG. 5, at step 601 ASR client 130 receives a request from the application to initiate a speech recognition task and, at step 602, ASR client 130 requests streaming audio from the audio input of client PC 140. Streaming audio digitized from the microphone input is then passed along to ASR client 130. At step 603, ASR client 130 compresses the digitized audio "on the fly" and then initiates transmission of streaming compressed digitized audio to ASR server 100, while speech input continues.

At step 604, ASR server 100 decompresses the compressed audio received from ASR client 130 before performing speech recognition on the streaming digitized audio. As described above with reference to FIG. 5, speech recognition is performed within the constraints of the selected grammar as defined by the activation rule. At step 605, ASR server 100 returns streaming text (i.e., partially recognized speech) as the input speech is recognized. Thus, ASR server 100 returns initial results to ASR client 130 even as ASR server 100 continues to process additional compressed streaming audio being sent by ASR client 130, and may update or correct parts of the text already returned to ASR client 130 as part of the speech recognition task. Once all of the streaming audio has been received from ASR client 130, ASR server completes its speech recognition processing and returns a final version of recognized text (including corrections) at step 606. ASR client 130 receives the recognized text from ASR server 100 at step 607 as it comes in and returns the text to the application at step 608.

Another alternative embodiment for carrying out the speech recognition process in accordance with the present invention is shown in FIG. 7. Similar to the speech recognition process shown in FIGS. 5 and 6, at step 701 ASR client 130 receives a request from the application to initiate a speech recognition task and, at step 702, ASR client 130 requests streaming audio from the audio input of client PC 140. Streaming audio digitized from the microphone input is then passed along to ASR client 130. At step 703, ASR client 130 processes the digitized audio "on the fly" to extract features useful for speech recognition processing and then initiates transmission of extracted features to ASR server 100, while speech input continues. Extraction of relevant features from speech involves grammar-independent processing that is typically part of algorithms employed for speech recognition, and may be done using methods known to those skilled in the art, such as those based upon linear predictive coding (LPC) or Mel filter bank processing. Feature extraction provides information obtained from characteristics of voice signals while eliminating unnecessary information, such as volume.

Upon receiving extracted features from ASR client 130, ASR server 100 at step 704 performs speech recognition on the incoming features which are arriving "on the fly" (i.e., in manner analogous to streaming audio). Speech recognition is performed within the constraints of the selected grammar as defined by the activated rule. As is the case with the embodiments discussed above with reference to FIGS. 5 and 6, at step 705 ASR server 100 returns streaming text (i.e., partially recognized speech) to ASR client 130 as the input features are recognized. ASR server 100 continues to process additional extracted features being sent by ASR client 130, and may update or correct parts of the text already returned to ASR client 130. ASR server completes its speech recognition processing upon receipt of all of the extracted features from ASR client 130, and returns a final version of recognized text (including corrections) at step 706. ASR client 130 receives the recognized text from ASR server 100 at step 707 as it comes in and returns the text to the application at step 708.

The alternative embodiments described above with respect to FIGS. 6 and 7 each provide for additional processing at the client end. For the embodiment in FIG. 6, this entails compression of the streaming audio (with audio decompression at the server end); for the embodiment in FIG. 7, this included part of the speech recognition processing in the form of feature extraction. Using such additional processing at the client end significantly reduces the amount of data transmitted from ASR client 130 to ASR server 100. Thus, less data is required to represent the speech signals being transmitted. Where feature extraction is accomplished at the client end, such benefits are potentially sharply increased, because extracted features (as opposed to digitized voice signals) require less data and no features need be sent during periods of silence. The reduction of data produces a dual desired benefit: (1) it permits a reduction in bandwidth required to achieve a certain level of performance, and (2) it reduces the transmission time in sending speech data from ASR client to ASR server through the TCP/IP socket.

While typically a grammar rule will be activated prior to the initiation of transmission of speech information from ASR client 130 to ASR server 100, rule activation could take place after some or all of the speech information to be recognized has been sent from ASR client 130 to ASR server 100. In such a circumstance, ASR server 100 would not begin speech recognition efforts until a grammar rule has been activated. Speech sent by ASR client 130 prior to activation of a grammar rule could be stored temporarily by ASR server 100 to be processed by the recognizer or, alternatively, such speech could be ignored.

Further, multiple speech recognition tasks may be executed using the techniques of the present invention. For example, an ASR application could request ASR client 130 to instruct ASR server 100 to load a canned grammar for a telephone number (i.e., "PHONE NUMBER") and then request activation of a rule covering spoken numbers. After a phone number is spoken and recognized in accordance with the present invention (e.g., in response to a prompt to speak the phone number, ASR client 130 sends digitized spoken numbers to ASR server 100 for recognition), the ASR application could then request ASR client 130 to set up and initiate recognition of pizza ordering speech (e.g., load PIZZA grammar, activate ORDER rule, and initiate speech recognition) in accordance with the examples described above with reference to FIGS. 2–5.

In addition to the simple pizza ordering example used above for illustration, a wide array of potential ASR services may be provided over a packet network in accordance with the present invention. One example of an ASR application enabled by the present invention is a form-filling service for completing a form in response to spoken responses to information requested for each of a number of blanks in the form. In accordance with the present invention, a form-filling service may be implemented wherein ASR client 130 sends grammars representing the possible choices for each of the blanks to ASR server 100. For each blank, ASR client 130 requests activation of the appropriate grammar rule and sends a corresponding spoken answer made in response to a request for information needed to complete the blank. ASR server 100 applies an appropriate speech recognition algorithm in accordance with the selected grammar and rule, and returns text to be inserted in the form.

Other ASR services may involve an exchange of information (e.g., a dialogue) between server and client. For example, an ASR service application for handling flight reservations may, in accordance with the present invention as described herein, utilize a dialogue between ASR server 100 and ASR client 130 to accomplish the ASR task. A dialogue may proceed as follows:

Speaker (through ASR client 130 to ASR server 100):
"I want a flight to Los Angeles."
ASR server's response to ASR client (in the form of text or, alternatively, speech returned by ASR server 100 to ASR client 130):
"From what city will you be leaving?"
Speaker (through ASR client to ASR server):
"Washington, DC."
ASR server's response to ASR client:
"What day do you want to leave"
Speaker (ASR client to ASR server):
"Tuesday."
ASR server's response to ASR client:
"What time do you want to leave"
Speaker (ASR client to ASR server):
"4 O'clock in the afternoon."
ASR server's response to ASR client:
"I can book you on XYZ Airline flight 4567 from Washington, DC to Los Angeles on Tuesday at 4 O'clock PM. Do you want to reserve a seat on this flight?"

In this case, the information received from ASR server 110 is not literally the text from the recognized speech, but is information based upon the recognized speech (which would depend upon the application). Each leg of the dialogue may be accomplished in accordance with the ASR client-server method described above. As may be observed from this example, such an ASR service application requires of the ASR client and ASR server not only the ability to handle natural language, but also access to a large database that is constantly changing. To accomplish this, it may be desirable to have the ASR service application actually installed and executing in server node 110, rather than in client PC 140. Client PC 140 would, in that case, merely have to run a relatively small "agent" program that, at the control of the application program running at server node 110, initiates ASR client 130 and shepherds the speech input through ASR client 130 along to ASR server 100. An example of such an "agent" program may be, e.g., one that places a "talking head" on the screen of client PC 140 to assist the interaction between an individual using the ASR service application at client PC 140 and, through ASR client 130 and ASR server 100, send the person's speech information along to ASR server 100 for recognition.

In summary, the present invention provides a way of providing ASR services that may be made available to users over a packet network, such as the Internet, at a location remote from a system hosting an ASR engine using a client-server architecture.

What has been described is merely illustrative of the application of the principles of the present invention. Other arrangements and methods can be implemented by those skilled in the art without departing from the spirit and scope of the present invention.

What is claimed is:

1. A method of operating an automatic speech recognition service remotely accessible by a client over a packet network, comprising the steps of:
   a. receiving from the client over the packet network information corresponding to a grammar used for speech recognition;
   b. receiving from the client over the packet network information representing speech;
   c. recognizing the received speech information by applying an automatic speech recognition algorithm in accordance with the grammar; and
   d. sending information based upon the recognized speech over the packet network to the client.

2. The method according to claim 1, further comprising the step of if the information corresponding to a grammar is an address corresponding to the location of a grammar, obtaining access to a grammar located at the corresponding grammar address.

3. The method according to claim 2, wherein the address corresponding to the location of a grammar is a uniform resource locator-compatible address.

4. The method according to claim 1, wherein the information representing speech arrives from the client in a streaming manner.

5. The method according to claim 1, wherein the information representing speech received from the client comprises digitized speech.

6. The method according to claim 1, wherein the information representing speech received from the client comprises compressed digitized speech.

7. The method according to claim 1, wherein the information representing speech received from the client comprises features extracted by the client from digitized speech.

8. The method according to claim 1, wherein the step of recognizing the received speech information is repeated as new speech information is received from the client.

9. The method according to claim 1, wherein the information based upon the recognized speech comprises text information.

10. The method according to claim 1, wherein the information based upon the recognized speech comprises additional speech.

11. The method according to claim 1, wherein the step of sending information based upon the recognized speech is repeated as additional speech information is recognized.

12. The method according to claim 11, further comprising the step of sending to the client revised information based upon recognized speech previously sent to the client.

13. The method according to claim 1, wherein the steps of b, c and d are repeated to create an exchange of information between client and server.

14. The method according to claim 13, wherein the information based upon the recognized speech comprises text information.

15. The method according to claim 13, wherein the information based upon the recognized speech comprises additional speech.

16. The method according to claim 1, further comprising the step of activating a grammar rule in response to a request received from the client over the packet network.

17. The method according to claim 1, further comprising the step of sending over the packet network to the client a handle corresponding to the grammar.

18. A system for operating an automatic speech recognition service remotely accessible by a client over a packet network, comprising:
  a. as programmable processor;
  b. memory;
  c. an audio input device; and
  d. a communications interface for establishing a communications link with the client over the packet network;
  wherein said processor is programmed to execute a series of steps comprising:
    i. receiving from the client over the packet network information corresponding to a grammar used for speech recognition;
    ii. receiving from the client over the packet network information representing speech;
    iii. recognizing the received speech information by applying an automatic speech recognition algorithm in accordance with the grammar; and
    iv. sending information based upon the recognized speech over the packet network to the client.

19. The system according to claim 18, wherein the processor is further programmed to execute the step of if the information corresponding to a grammar is an address corresponding to the location of a grammar, obtaining access to a grammar located at the corresponding grammar address.

20. The system according to claim 19, wherein the address corresponding to the location of a grammar is a uniform resource locator-compatible address.

21. The system according to claim 18, wherein the information representing speech arrives from the client in a streaming manner.

22. The system according to claim 18, wherein the information representing speech received from the client comprises digitized speech.

23. The system according to claim 18, wherein the information representing speech received from the client comprises compressed digitized speech.

24. The system according to claim 18, wherein the information representing speech received from the client comprises features extracted by the client from digitized speech.

25. The system according to claim 18, wherein the processor is further programmed to repeat the step of recognizing the received speech information as new speech information is received from the client.

26. The system according to claim 18, wherein the information based upon the recognized speech comprises text information.

27. The system according to claim 18, wherein the information based upon the recognized speech comprises additional speech.

28. The system according to claim 18, wherein the processor is further programmed to repeat the step of sending information based upon the recognized speech as additional speech information is recognized.

29. The system according to claim 28, wherein the processor is further programmed to execute the step of sending to the client revised information based upon recognized speech previously sent to the client.

30. The system according to claim 18, wherein the processor is further programmed to repeat the steps of b, c and d to create an exchange of information between client and server.

31. The system according to claim 30, wherein the information based upon the recognized speech comprises text information.

32. The system according to claim 30, wherein the information based upon the recognized speech comprises additional speech.

33. The system according to claim 18, wherein the processor is further programmed to execute the step of activating a grammar rule in response to a request from the client over the packet network.

34. The system according to claim 18, wherein the processor is further programmed to execute the step of sending over the packet network to the client a handle corresponding to the grammar.

35. An article of manufacture, comprising a computer-readable medium having stored thereon instructions for operating an automatic speech recognition service remotely accessible by a client over a packet network, said instructions which, when performed by a processor, cause the processor to execute a series of steps comprising:
  a. receiving from the client over the packet network information corresponding to a grammar used for speech recognition;
  b. receiving from the client over the packet network information representing speech;
  c. recognizing the received speech information by applying an automatic speech recognition algorithm in accordance with the grammar; and
  d. sending information based upon the recognized speech over the packet network to the client.

36. The article of manufacture according to claim 35, wherein the instructions, when performed by a processor, further cause the processor to execute the step of if the information corresponding to a grammar is an address corresponding to the location of a grammar, obtaining access to a grammar located at the corresponding grammar address.

37. The article of manufacture according to claim 36, wherein the address corresponding to the location of a grammar is a uniform resource locator-compatible address.

38. The article of manufacture according to claim 35, wherein the information representing speech arrives from the client in a streaming manner.

39. The article of manufacture according to claim 35, wherein the information representing speech received from the client comprises digitized speech.

40. The article of manufacture according to claim 35, wherein the information representing speech received from the client comprises compressed digitized speech.

41. The article of manufacture according to claim 35, wherein the information representing speech received from the client comprises features extracted by the client from digitized speech.

42. The article of manufacture according to claim 35, wherein the instructions, when performed by a processor, further cause the processor to repeat the step of recognizing the received speech information as new speech information is received from the client.

43. The article of manufacture according to claim 35, wherein the information based upon the recognized speech comprises text information.

44. The article of manufacture according to claim 35, wherein the information based upon the recognized speech comprises additional speech.

45. The article of manufacture according to claim 35, wherein the instructions, when performed by a processor, further cause the processor to repeat the step of sending information based upon the recognized speech as additional speech information is recognized.

46. The article of manufacture according to claim 45, wherein the instructions, when performed by a processor, further cause the processor to execute the step of sending to the client revised information based upon recognized speech previously sent to the client.

47. The article of manufacture according to claim 35, wherein the instructions, when performed by a processor, further cause the processor to repeat the steps of b, c and d to create an exchange of information between client and server.

48. The article of manufacture according to claim 47, wherein the information based upon the recognized speech comprises text information.

49. The article of manufacture according to claim 47, wherein the information based upon the recognized speech comprises additional speech.

50. The article of manufacture according to claim 35, wherein the instructions, when performed by a processor, further cause the processor to execute the step of activating a grammar rule in response to a request received from the client over the packet network.

51. The article of manufacture according to claim 35, wherein the instructions, when performed by a processor, further cause the processor to execute the step of sending over the packet network to the client a handle corresponding to the grammar.

52. A method for recognizing speech over a packet network, comprising:
    receiving a grammar from a client;
    receiving a plurality of digitized speech packets from the client;
    processing the plurality of digitized speech packets using a speech recognition algorithm and the grammer to produce a textual representation of the plurality of digtized speech packets; and
    sending information based upon the textual representation to the client.

53. The method of claim 52, wherein said packet network comprises a TCP/IP network.

54. The method of claim 52, wherein said grammar comprises a representation of the language spoken in a predetermined context.

55. The method of claim 52, wherein said grammar comprises a statistical language model.

56. The method of claim 52, wherein said grammar comprises a plurality of subgrammars.

57. The method of claim 52, wherein said step of receiving a grammar further comprises:
    receiving a network address associated with the grammar from the client; and
    receiving the grammar from the network address.

58. The method of claim 57, wherein said network address comprises a uniform resource locator.

59. The method of claim 52, wherein said plurality of digitized speech packets comprises streaming digitized audio.

60. The method of claim 52, wherein said plurality of digitized speech packets comprises a plurality of compressed digitized speech packets.

61. The method of claim 52, wherein said plurality of digitized speech packets comprises a plurality of speech features extracted by the client.

62. The method of claim 52, wherein said information comprises an initial version of said textual representation.

63. The method of claim 52, wherein said information comprises streaming text.

64. The method of claim 52, wherein said information comprises a final version of said textual representation.

65. The method of claim 52, wherein said information comprises digitized speech packets.

66. The method of claim 52, further comprising the step of activating a grammar rule in response to a request received from the client.

\* \* \* \* \*

UNITED STATES PATENT AND TRADEMARK OFFICE
CERTIFICATE OF CORRECTION

PATENT NO. : 6,366,886 B1
DATED : April 2, 2002
INVENTOR(S) : Dragosh et al.

It is certified that error appears in the above-identified patent and that said Letters Patent is hereby corrected as shown below:

Column 11,
Line 31, delete "as" and insert -- a --;

Column 12,
Line 31, after "request" insert -- received --; and

Column 14,
Line 7, delete "grammer" and insert -- grammar --.

Signed and Sealed this

Second Day of December, 2003

JAMES E. ROGAN
*Director of the United States Patent and Trademark Office*